US008042629B2

(12) United States Patent
Mackenzie (10) Patent No.: US 8,042,629 B2
(45) Date of Patent: Oct. 25, 2011

(54) SNOW TRACTION UNIT FOR VEHICLES (76) Inventor: Roderick Mackenzie, Daylesford (AU)

( * ) Notice: Subject to any disclaimer, the term of this patent is extended or adjusted under 35 U.S.C. 154(b) by 192 days.

(21) Appl. No.: 12/303,743

(22) PCT Filed: Jun. 8, 2007

(86) PCT No.: PCT/AU2007/000804
§ 371 (c)(1),
(2), (4) Date: Dec. 8, 2008

(87) PCT Pub. No.: WO2007/140539
PCT Pub. Date: Dec. 13, 2007

(65) Prior Publication Data
US 2010/0219004 A1    Sep. 2, 2010

(30) Foreign Application Priority Data

Jun. 8, 2006    (AU) ................................ 2006903108

(51) Int. Cl.
B62D 55/04    (2006.01)
B62D 55/065   (2006.01)
B62D 55/084   (2006.01)
B62D 55/092   (2006.01)

(52) U.S. Cl. ...... 180/9.21; 180/9.46; 180/234; 180/414; 305/120; 305/127; 305/168

(58) Field of Classification Search ................. 180/9.21, 180/234, 403, 414, 9.42, 9.46; 305/120, 305/127, 168
See application file for complete search history.

(56) References Cited

U.S. PATENT DOCUMENTS

| 3,770,330 | A |   | 11/1973 | Bombardier |
| 3,822,755 | A | * | 7/1974  | Hine ............................. 180/185 |
| 4,618,015 | A |   | 10/1986 | Yochum |
| 5,113,958 | A |   | 5/1992  | Holden |
| 5,586,614 | A | * | 12/1996 | Kouchi et al. ................. 180/190 |
| 5,823,284 | A | * | 10/1998 | Hoar et al. ..................... 180/240 |
| 5,855,248 | A | * | 1/1999  | Rawson et al. .............. 180/9.21 |
| 5,975,226 | A | * | 11/1999 | Matsumoto et al. ......... 180/9.34 |
| 6,006,847 | A |   | 12/1999 | Knight |
| 6,155,363 | A |   | 12/2000 | Matsumoto et al. |
| 6,761,234 | B1|   | 7/2004  | Lamela et al. |
| 7,712,557 | B2| * | 5/2010  | Duceppe ...................... 180/9.21 |

FOREIGN PATENT DOCUMENTS

GB    1436267 A1    5/1976
WO    2006/066406 A1    6/2006

* cited by examiner

Primary Examiner — Tony H. Winner
Assistant Examiner — Wesley Potter
(74) Attorney, Agent, or Firm — Connolly Bove Lodge & Hutz LLP (57) ABSTRACT A snow traction unit to replace a wheel of an all wheel drive vehicle which includes a frame supporting two carrier wheels; said carrier wheels being spaced apart a distance greater than their combined radii; an endless snow contacting track mounted for rotation on said carrier wheels; a track contacting surface provided between the lower extremities of said carrier wheels; a drive engagement means for engaging the drive shaft of the vehicle and for driving at least one of said carrier wheels; the arrangement of the width of the track, the spacing between the carrier wheels and the track contacting surface resulting in the vehicle having a force imprint less than 250 Kg/square meter.

6 Claims, 7 Drawing Sheets

SNOW TRACTION UNIT FOR VEHICLES

CROSS REFERENCE TO RELATED APPLICATIONS

This application is a National Phase filing under 35 U.S.C. §371 of PCT/AU2007/000804 filed Jun. 8, 2007, which claims priority to Patent Application No. 2006903108, filed in Australia on Jun. 8, 2006. The entire contents of each of the above-applications are incorporated herein by reference.

This invention relates to the conversion of vehicle particularly 4 wheel drive vehicles to over snow vehicles with improved snow handling.

BACKGROUND TO THE INVENTION

Many over snow vehicles can only be used for that purpose. There is a need for conversion units that can convert wheeled vehicles to effective over snow vehicles.

U.S. Pat. No. 3,710,886 discloses a conversion kit with a track for each side of a vehicle and the use of the brakes for steering. The track passes over a series of rollers.

U.S. Pat. No. 4,069,883 discloses a street car conversion with front skis for steering and a rear track for propulsion.

U.S. Pat. No. 4,313,516 discloses a similar arrangement which uses a chain drive from the rear wheels for the track. The tracks use rollers to support the track belt.

U.S. Pat. No. 4,719,882 is also a ski and track combination and takes its power from an extended drive shaft.

U.S. Pat. No. 5,855,248 discloses a kit that uses the existing wheels but is more for soft ground rather than snow.

Some patents have been concerned with farm tractor conversions.

U.S. Pat. No. 5,388,656 discloses a track for the road wheel of a tractor. U.S. Pat. No. 5,343,960 discloses a tracked conversion for a tractor that also uses an hydraulic steering attachment that is steered from the steering wheel. A single track is used on each side and the tracks pass over a horizontal slide when contacting the snow.

U.S. Pat. No. 5,361,860 discloses a track conversion where the steering is from attached trailing equipment.

U.S. Pat. No. 5,924,503 discloses a drive system for a tracked wheel.

U.S. Pat. No. 6,199,646 discloses a semi-crawler arrangement for the rear wheel of a farm tractor.

These prior art arrangements are generally unsatisfactory because the vehicle load on the snow is too high and the steering of the vehicle is non responsive or places the snow under too much shear so that propulsion over snow is inhibited. Eg: two directional shear when traversing, transverse, across a slope, one track moving faster than the other to prevent sideways slip, the effect being a torque onto the snow. All existing oversnow vehicles have a side slope maximum traverse angle of about thirteen degrees.

It is an object of this invention to provide a conversion for vehicles that ameliorates these problems

BRIEF DESCRIPTION OF THE INVENTION

To this end the present invention provides a vehicle snow conversion unit which replaces a wheel of a wheeled vehicle said unit comprising drive engagement means which is engagable with the vehicle drive shaft an endless belt which is driven by the drive engagement means, which belt passes over horizontal plate to provide a bearing surface on the snow.

The advantage of this invention is that a separate unit is used with each wheel and by appropriate sizing of the width and the length of the track, the force imprint is less than 250 Kg/square meter.

Thus in one aspect the present invention provides a snow traction unit to replace a wheel of an all wheel drive vehicle which includes
 a) a frame supporting two carrier wheels
 b) said carrier wheels being spaced apart a distance greater than their combined radii
 c) an endless snow contacting track mounted for rotation on said carrier wheels
 d) a track contacting surface provided between the lower extremities of said carrier wheels
 e) a drive engagement means for engaging the drive shaft of the vehicle and for driving at least one of said carrier wheels
the arrangement of the width of the track, the spacing between the carrier wheels and the track contacting surface resulting in the vehicle having a force imprint less than 250 Kg/square meter.

This invention is in part predicated on the realization that where the track passes over a series of rollers the weight of the vehicle is born on a series of line contacts corresponding to the roller positions and this results in very high force imprints onto the snow. The provision of the plate support for the track eliminates this problem.

4 wheel drive vehicles can be converted to over snow vehicles with a force imprint of less than 250 Kg/square meter. The track that fits over each wheel incorporates a ski section over which the track moves.

Each unit preferably consists of two track support wheels over which the snow contact track passes. These two wheels are spaced apart to provide a horizontal track section between the lower extremity of each wheel and a flat surface is provided for the track to pass over. This flat plate is coated in a low friction material such as, polyethylene. Each unit has a frame that supports the two track carrier wheels and the track support plate. In one embodiment a drive pulley is driven by the vehicle axle and a belt from the drive pulley to at least one of the carrier wheels, provides the means to move the endless track over the support plate. Snow lubricates the surfaces between the moving track and the stationary polyethylene coated plate. The endless belt preferably moves over the surface of an endless rail and is held to the rail by slidable bracket that enclose the rail and ensures that the belt cannot become detached from the guide rail. The endless rail functions as the support plate between the wheels. Rubber sprockets or pneumatic tires with a sprocket surface are used as the wheels to engage, guide and drive the endless belt. The guide rail preferably extends around the periphery of the sprockets and preferably the sprockets incorporate a recess to accommodate the rail so that the sprocket rotates past the stationary rail.

The tracks include a central portion that passes over the plate and at least one lateral track portion spaced from the central track by spacer spars. This results in the track being flexible in two directions both longitudinally and laterally.

The front pair of tracks are steerable from the vehicle steering mechanism and optionally the rear tracks may be included, to provide an all wheel steering mechanism.

Steering does not rely on changing the relative speed of tracks on opposite sides of the vehicle (as in steering by braking) but by using a steering system adapted with a hydraulic system. It is preferred to provide 4 wheel steering by using the hydraulic assisted steering to move the rear wheels opposite to the front wheels. The pivot point, relative to the chassis, of each track unit is preferably below the units centre of mass and preferably below 300 mm above the snow surface. The drag link in the steering mechanism for each pair of front and rear units incorporates an hydraulic actuator that is attached to the track unit at a point behind the pivot points of the front track units and in front of the pivot points of the rear track units. The hydraulic actuator for the rear wheels moves opposite to the direction of the front actuator. It is within the scope of this invention to provide for decoupling of the hydraulic actuators so that the front and rear wheels can be steered independently using a separate control lever for each actuator. This enables the vehicle to traverse difficult terrain or obstacles and to move diagonally relative to the centre line of the vehicle chassis.

DETAILED DESCRIPTION OF THE INVENTION

A preferred embodiment of the invention is shown in the illustrations in which.

Figure 1:
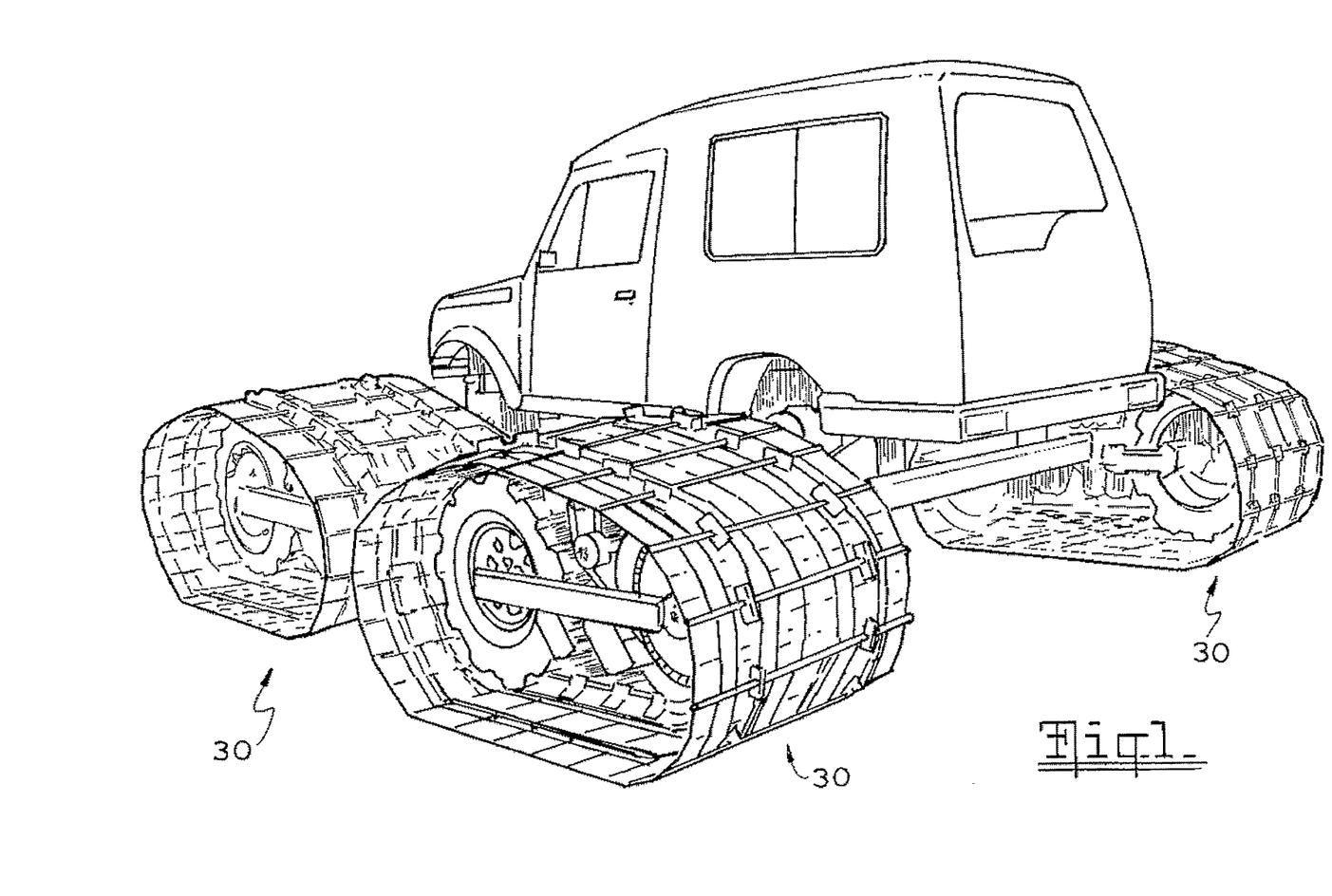
FIG. 1 shows a vehicle mounted on a snow traction unit according to one embodiment of this invention.

The embodiment illustrated consists of a chassis 11 onto which a vehicle 13, preferably a four wheel drive vehicle, is placed, so that the front and rear axles 15, 16 align with the 4 snow track units 30 which are attached to the chassis 11.

Figure 2:
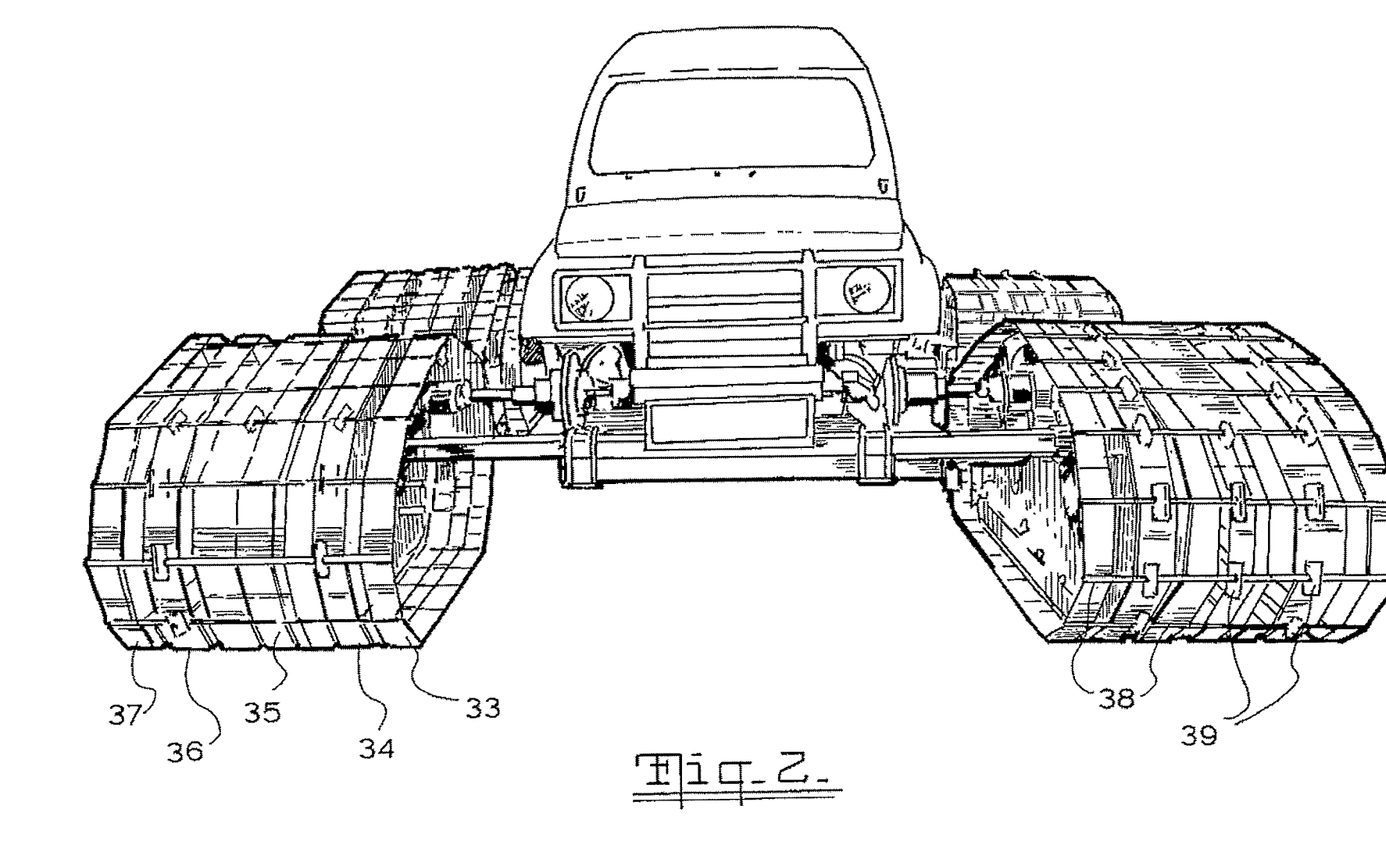
FIG. 2 is a front view showing the snow contact tracks of one embodiment of this invention.

Each snow track unit 30 has a snow contact track surface 32 composed of 5 separate belts 33, 34, 35 36 and 37 linked by the lateral battens 38. These battens 38 may be made of spring steel and are secured to tracks 34 and 36 by brackets 39 and are elastically attached to the other tracks. The width of the track units, which is preferably about a meter and the lateral flexibility provided by the battens 38 provide a better snow contact surface that is able to flex longitudinally and laterally. This lateral flexibility provided by the battens 38 enables the track units 30 to respond to varying surface topology.

Figure 5:
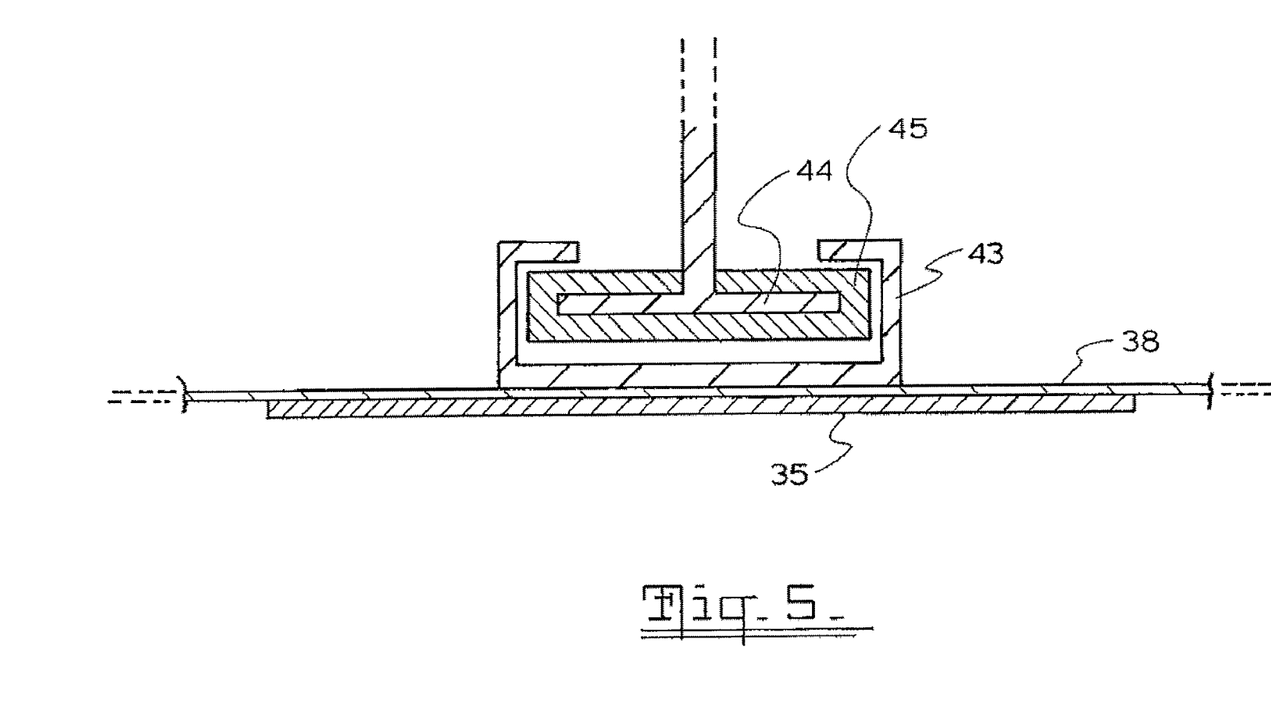
FIG. 5 is a cross sectional view of the track and guide rail.

The central track 35 is an endless belt that moves over a support rail 40. The central track 35 also moves over the track engaging wheels 53 and 54 which function as sprockets. The wheels 53 and 54 may be solid rubber or pneumatic tyres and this provides added resilience and flexibility to the track units in traversing uneven ground. The support rail 40 is accommodated in a central groove of the outer surface of the wheels 53 and 54. The central track 35 is attached to the rail 40 by slidable brackets 43 that encompass the rail 40 as shown in FIG. 5. This ensures that the track 35 cannot detach from the rail 40 during use.

The rail 40 is composed of a spring steel plate 44 coated in low friction polyethylene 45 which has a low frictional contact with the track 35 and this contact surface is lubricated by snow entering between the lower surface of rail 40 and the internal surface of the track 35. Cogs 42 on the wheels 53 and 54 are located on either side of the rail 40 and engage with the brackets 43 of track 35 so that the brackets 43 pass along on either side of the rail 40. The wheels 53 and 54 are supported by the bar 46 which is part of the track unit support frame. The flexible transverse spars 38 provide a cushioning effect which allows much faster movement over rocky terrain than any prior art system. Vehicles fitted with the units of this invention can move up riverbeds at about fifteen Kmh. This is faster than tanks can move in such terrain. If desired a pneumatic tire may be provided around the entire central belt 35 such that vehicles would be able to move very fast over rocky terrain. It would also eliminate the only high pressure point (line) on the unit and would thus allow movement over minefields with non-magnetic triggers.

Figure 3:
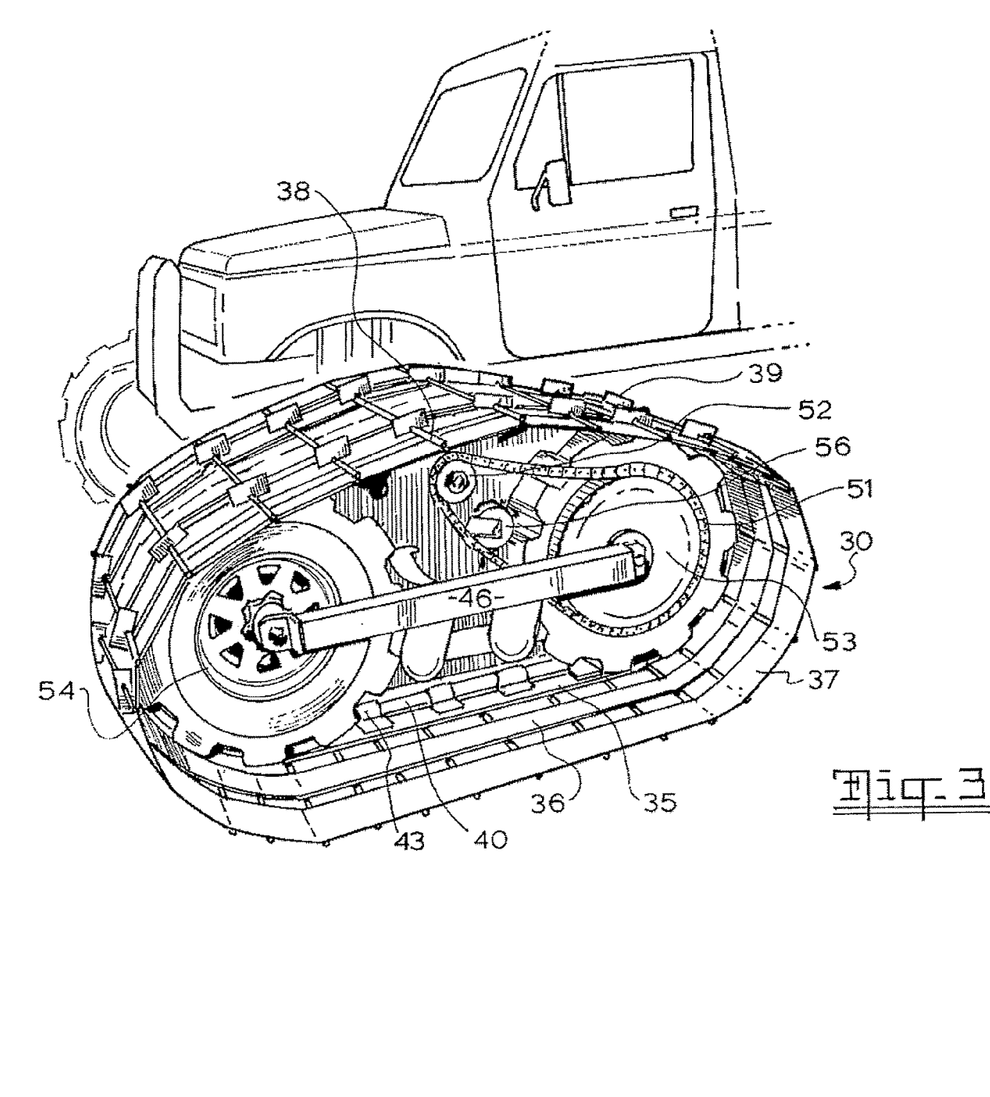
FIG. 3 is a side view of one of the track assemblies shown in FIGS. 1 and 2.
Figure 4:
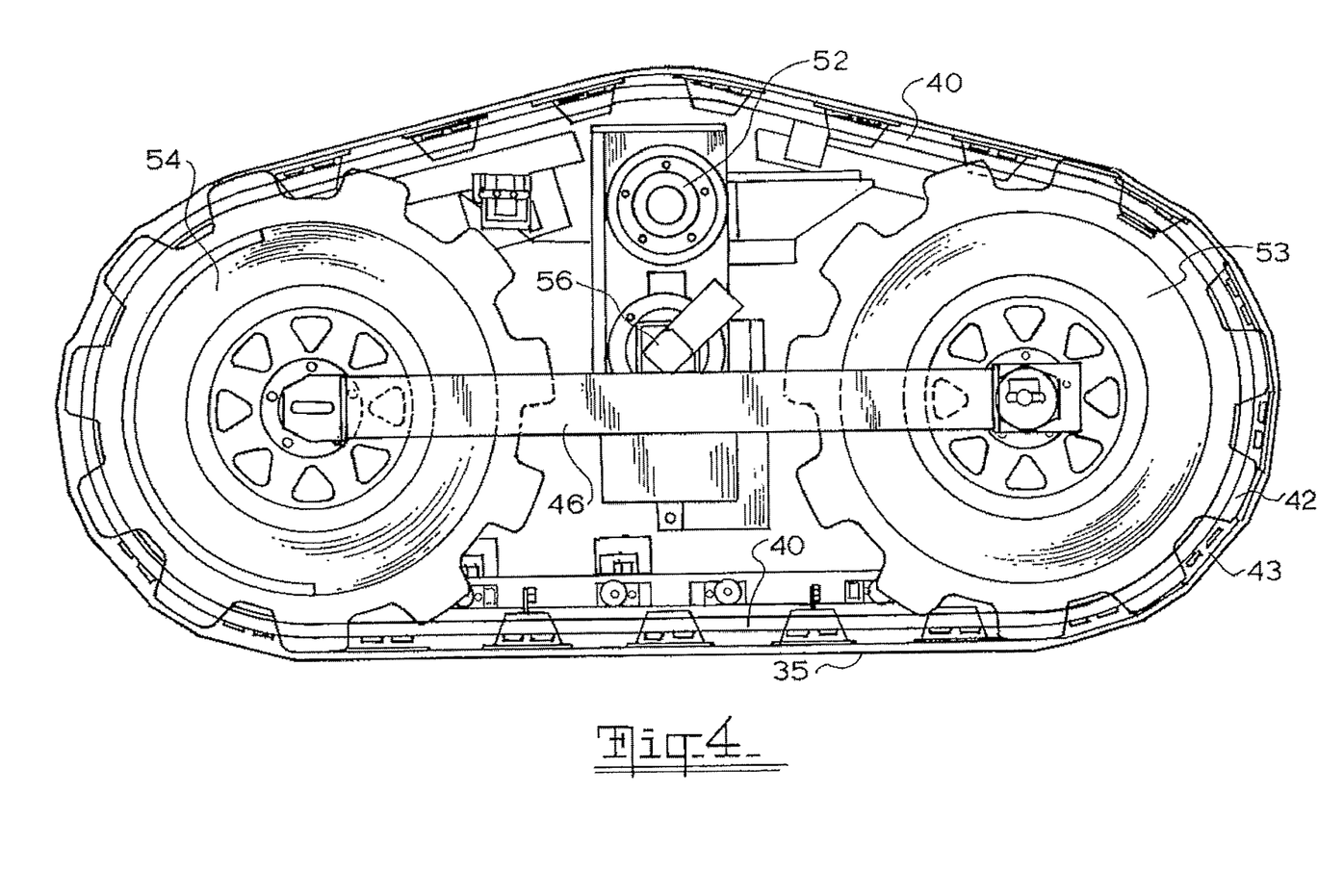
FIG. 4 is a detailed schematic view of FIG. 3.

Each snow track unit 30 has a drive pulley 52 driven by the vehicle axle associated with that unit. The drive pulley 52 rotates the belt 51 to drive wheel 53. The drive belt 51 is tensioned by roller 56.

A quick release attachment means such a ball and socket attachment for attaching the individual track units 30 to a four wheel drive vehicle can be provided.

It is preferred that the pivot point for each unit 30 is below the drive shaft and as close to the ground surface as is feasible.

Figure 6:
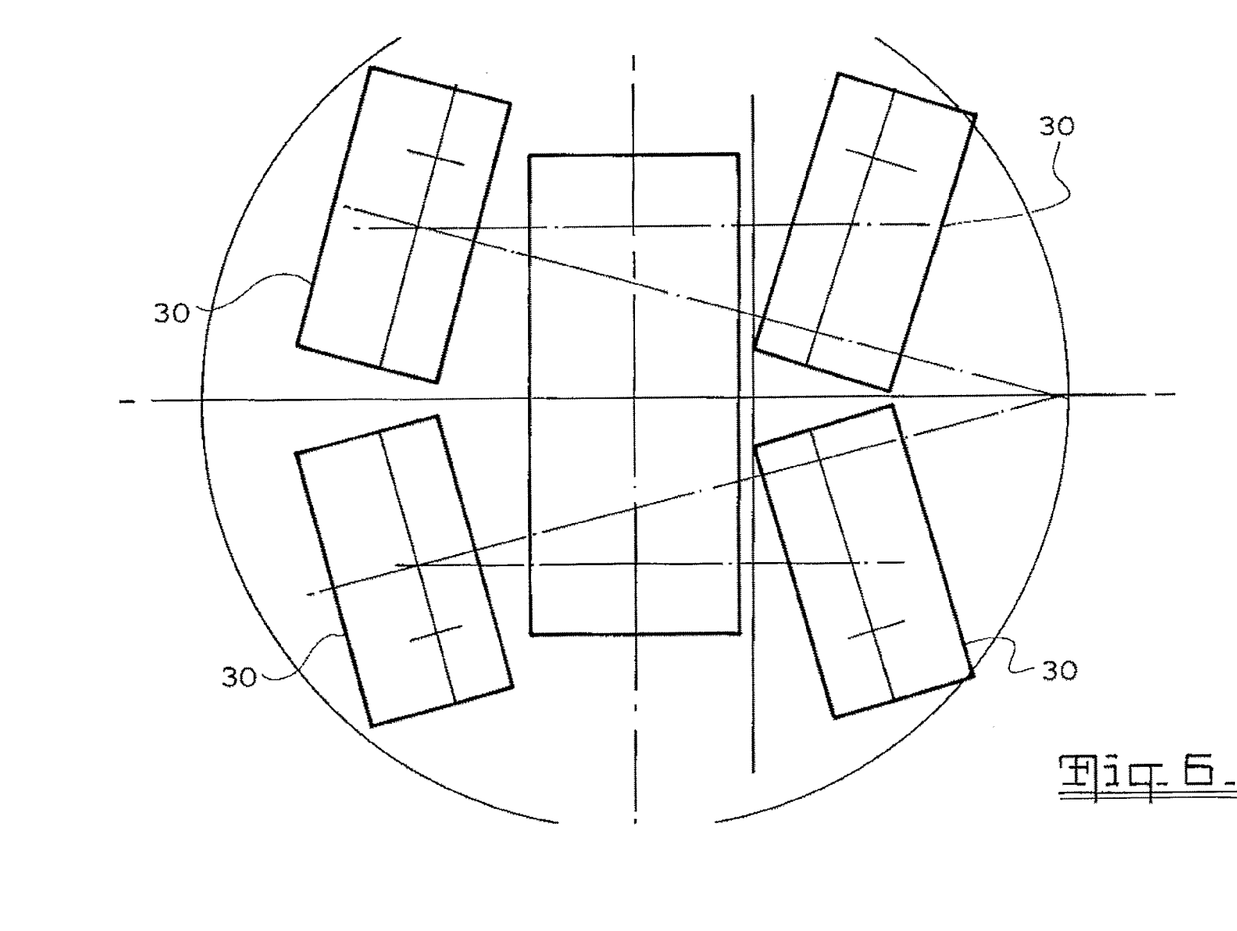
FIG. 6 is a schematic outline of the steering system according the embodiment illustrated in FIG. 1.

The vehicle steering mechanism is replaced with a hydraulic system responsive to the steering wheel and which turns the front pair of snow track units in one direction and the rear pair in the alternate direction to provide 4 wheel steering of the vehicle as illustrated in FIG. 6. This avoids the use of differential braking as a means of steering the vehicle and minimizes shear on the snow to provide maximum traction on the snow surface.

Figure 7:
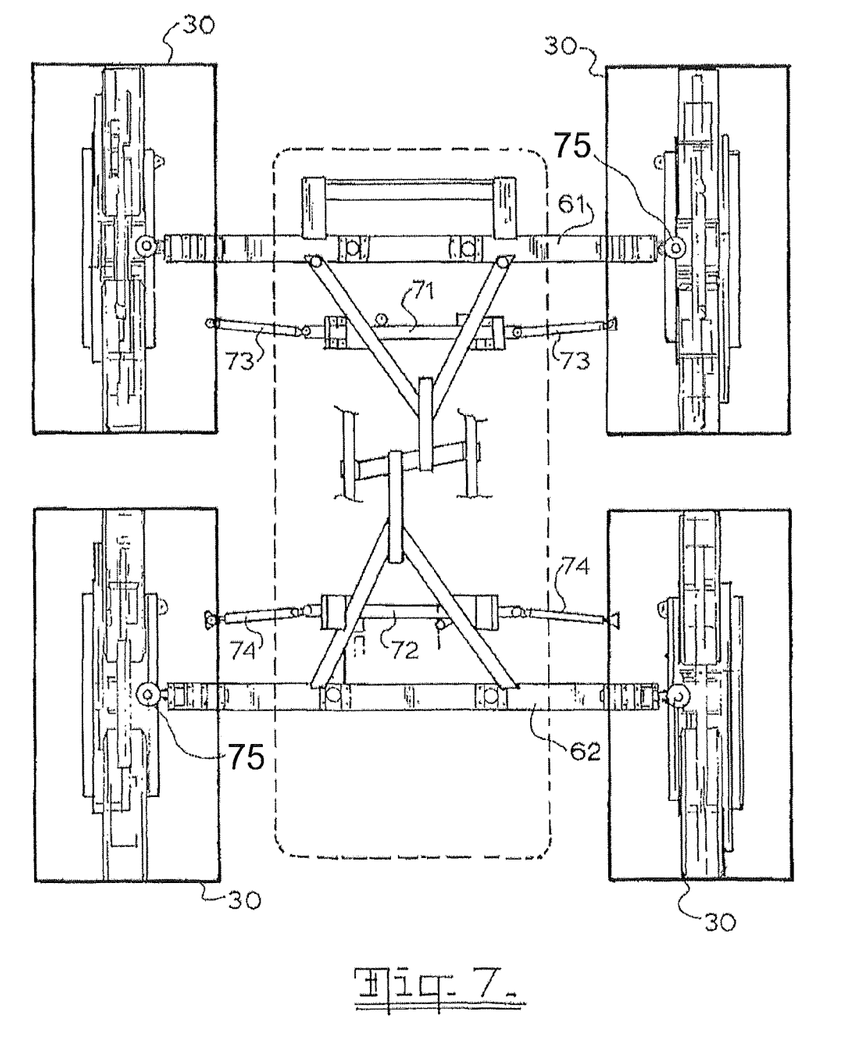
FIG. 7 is a schematic of the steering mechanism of FIG. 6.

As shown in FIG. 7 the main elements of the steering mechanism are two hydraulic actuators 71 located behind the front drive shaft 61 and 72 located in front of the rear drive shaft 62. These form the drag link for the steering mechanism with the radius arms 73 and 74 attaching to the units 30 in the same plane as the pivot points 75 of the units 30 relative to the chassis. The radius arms in this embodiment are arranged so that the inside track has a maximum angle of deflection of 18° and the outer wheel 11°. The hydraulic actuator 71 moves in the opposite direction to actuator 72 so that the units move as in a 4 wheel steering vehicle as depicted schematically in FIG. 6. However it is also possible to decouple the actuators 71, 72 so that each can be operated independently if the conditions warrant it.

The units are able to individually pivot in the longitudinal direction which means the units can oscillate in a longitudinal direction such that the tip and tail can move up and down. This is not possible with prior art tracks use rigidly mounted tracks. This allows the vehicles fitted with the units of this invention to traverse very difficult terrain and climb steps.

It is within the scope of this invention to have a hydraulicly controlled gear change mechanism on each unit, to allow high speed movement on flat terrain.

It can be seen from the above description that the present invention provides a unique and low cost conversion of a four wheel drive road vehicle to a snow vehicle.

Those skilled in the art will realize that other embodiments using different components may be made without departing from the core teachings of this invention.

The invention claimed is:

1. A snow traction unit to replace a wheel of a vehicle, wherein said snow traction unit includes:
   a) a frame supporting two carrier wheels;
   b) said carrier wheels being spaced apart a distance greater than their combined radii;
   c) an endless snow contacting track mounted for rotation en around said carrier wheels; and
   d) a guide rail provided between the lower extremities of said carrier wheels, wherein said snow contacting track moves over said guide rail;
   e) a drive engagement means engaging a drive shaft of the vehicle and driving at least one of said carrier wheels, wherein the guide rail includes a contact surface of a low friction material and during operation, snow enters between and lubricates the endless track and the guide rail, and wherein the endless track is coupled to the guide rail by slidable brackets that encompass the guide rail so as to prevent detachment of the endless track from the guide rail during use, the arrangement of the width of the track, the spacing between the carrier wheels and the guide rail resulting in the vehicle having a force imprint less than 250 Kg/square meter.

2. The snow traction unit as claimed in claim 1 in which the carrier wheels are composed of rubber or incorporate a pneumatic tire.

3. The snow traction unit as claimed in claim 1 in which the belt includes a central portion that passes over the guide rail and at least one lateral portion spaced from the central portion by spacer bars so that the belt is flexible in two directions both longitudinally and laterally.

4. A four wheel drive vehicle in which each of the four wheels is replaced by a snow traction unit as claimed in claim 1 in which the front pair of units are steerable by a first hydraulic actuator.

5. The vehicle as claimed in claim 4, wherein the rear pair snow traction units are steered by a second hydraulic actuator and in which the two hydraulic actuators are coupled so that the rear actuator moves in the opposite direction to the front actuator.

6. A vehicle as claimed in claim 5 in which a drag link of the front steering actuator is connected to one of the front units behind respective pivot points of the two front traction units and a drag link of the rear wheel steering actuator is connected to one of the rear units in front of respective pivot points of the two rear traction units.

* * * * *